United States Patent

[11] 3,595,085

| [72] | Inventor | Robert S. Harrah<br>4108 DuPont, Houston, Tex. 77021 |
|---|---|---|
| [21] | Appl. No. | 17,601 |
| [22] | Filed | Mar. 9, 1970<br>Division of Ser. No. 731,950, May 24, 1968, Pat. No. 3,555,909 |
| [45] | Patented | July 27, 1971 |

[54] INDICATING DEVICES
14 Claims, 7 Drawing Figs.

[52] U.S. Cl. .................................................. 73/410, 73/418, 346/139
[51] Int. Cl. ..................................................... G01l 7/04
[50] Field of Search .......................................... 73/411– –418, 406, 407, 410; 346/139

[56] References Cited
UNITED STATES PATENTS

| 2,764,894 | 10/1956 | Faxen | 74/95 |
|---|---|---|---|
| 2,930,235 | 3/1960 | Oppenheim | 73/411 |
| 2,979,954 | 4/1961 | Henschen et al. | 74/411 X |

FOREIGN PATENTS

| 355,358 | 8/1905 | France | 73/411 |

*Primary Examiner*—Donald O. Woodiel
*Attorney*—Donald Gunn

ABSTRACT: In meter movements wherein a pointer moves across a scale in response to relatively small deflections of a Bourdon tube, bellows or the like, improved means comprising motion transferring means operatively connected to the transducer and connected to the pointer wherein the pointer is rotated relative to the scale by operation of a frictionless and gearless mechanism converting the transverse movement of the transducer to rotation of the pointer.

PATENTED JUL 27 1971 3,595,085

ROBERT S. HARRAH
INVENTOR.

BY Donald Gunn
ATTORNEY

PATENTED JUL 27 1971
3,595,085
SHEET 2 OF 3
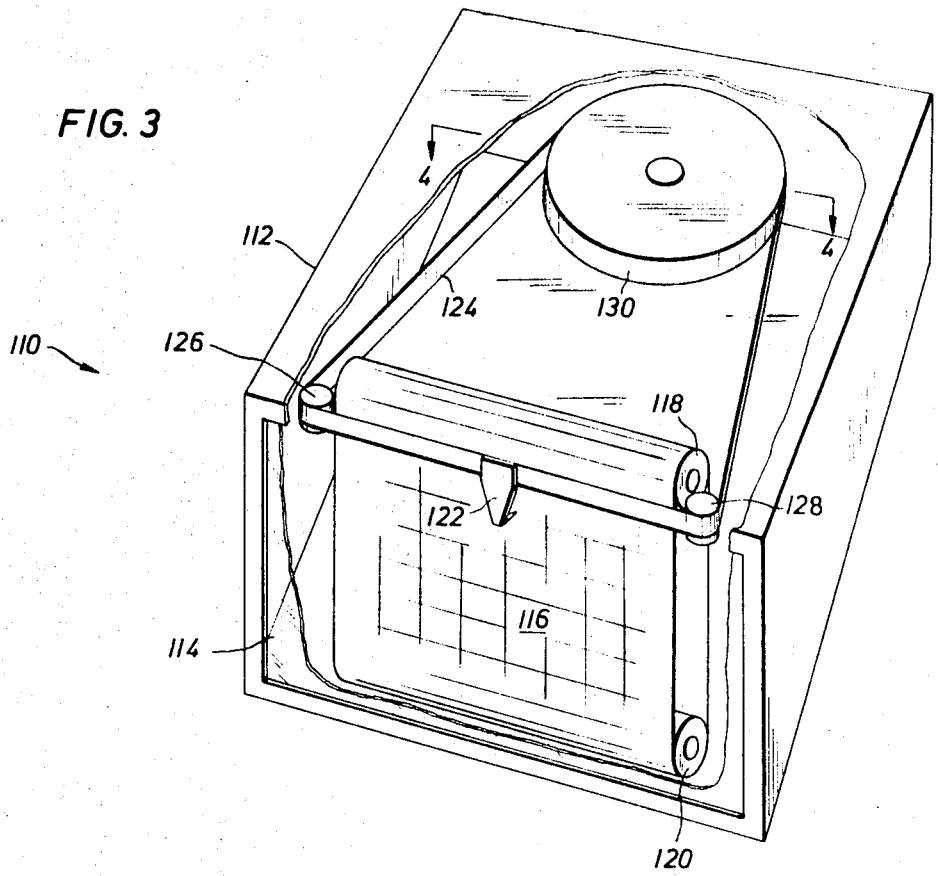
FIG. 3
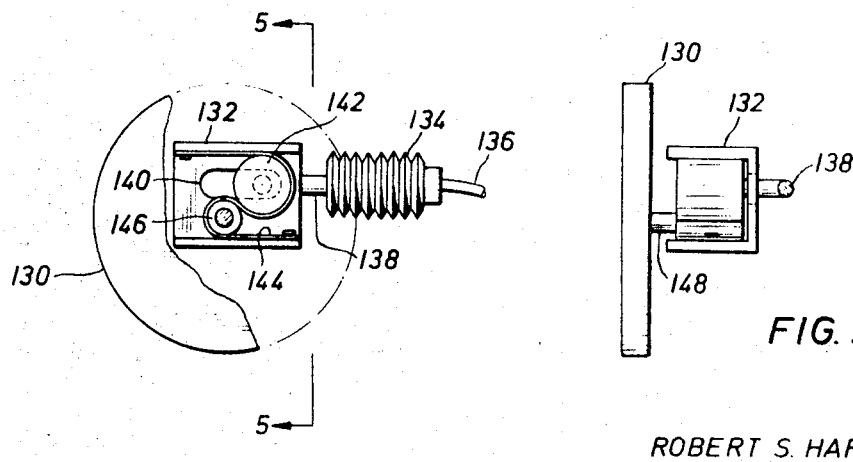
FIG. 4
FIG. 5
ROBERT S. HARRAH
INVENTOR.
BY Donald Lunn
ATTORNEY

PATENTED JUL 27 1971

ROBERT S. HARRAH
INVENTOR.

BY *Donald Gunn*

ATTORNEY 3,595,085

INDICATING DEVICES

RELATED APPLICATIONS

This application is a divisional application of Ser. No. 731,950, filed on May 24, 1968, now Pat. No. 3,555,909, issued Jan. 19, 1971.

SUMMARY OF PROBLEM AND INVENTION

Bourdon tubes, bellows, diaphragms and the like are often coupled to meter movements. Meter devices are normally calibrated with a scale extending perhaps 270° about the face wherein a pointer provides a suitable indication for an observer. While meter devices are used with many types of variables, the nature of which is of no particular concern to the present invention, the devices of the prior art have been found wanting in several regards. A principle problem in the prior art is the transfer of a relatively small movement of a Bourdon tube, bellows, or other transducer converting the variable into pointer movement. The means converting such small movements into deflection of the pointer have generally been found wanting. While many devices are available and are used in great quantities, typical arrangements today incorporate gears or the like which are subject to substantial wear. While the apparatus is not subject to great loads, oscillations at the point of installation and rapid pulsations in the variable being measured create vibrations which wear the equipment. The vibrations cause wear in the components transferring the movement from the transducer to the pointer. The accumulated wear causes play in the meter and impedes repeatability. Often, the worn meter must be zeroed and serviced frequently. In view of the undesirable results, the present invention is summarized as an improvement over the prior art wherein means are provided for transferring the incremental movement of the transducer to the pointer without wear, fatigue, or destruction of the apparatus. More specifically, the present invention incorporates means altering the linear motion of the transducer to pointer deflection by use of a flexible member preferably coiled around the stem on which the pointer is mounted to rotate the needle. The flexible member is drawn about the periphery of a wheel segment rotated by frictionless means connected to the transducer.

Many objects and advantages of the present invention will become more readily apparent from a consideration of the below included specification and drawings, wherein:

FIG. 3 shows a strip chart recorder incorporating the present invention;

FIG. 4 is a sectional view taken along the line 4–4 of FIG. 3 illustrating details of construction of the means of the present invention;

FIG. 5 is a sectional view taken along the line 5–5 of FIG. 4, illustrating further details of construction;

Figure 1:
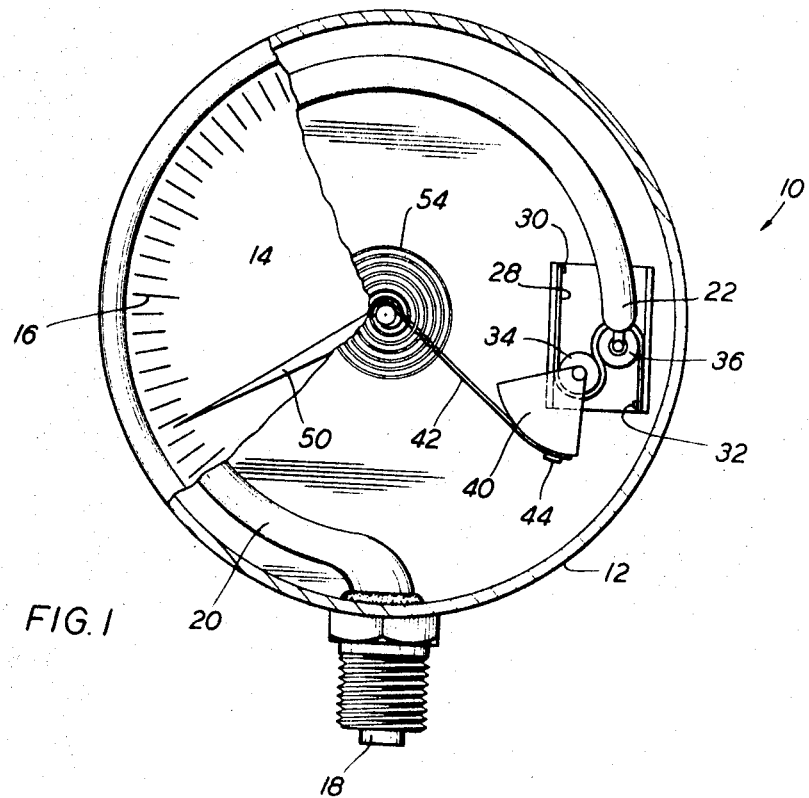
FIG. 1 is a front view of the structure shown in the parent case wherein the meter face has been removed to disclose the structure converting transducer movement into rotation of the pointer with respect to the face.

In the drawings, attention is first directed to FIG. 1 which shows an indicating meter indicated generally by the numeral 10. The meter 10 incorporates a cylindrical housing 12 having a front face 14. A calibration scale 16 is placed about the face 14 and is divided into suitable units of measure. A suitable variable, such as pressure, fluid flow, or the like, is conveyed to the meter 10 by means not within the scope of the present disclosure through a tubing coupling 18. Assuming, for example, that a pressure is communicated to the coupling 18, the coupling 18 provides fluid communication to a Bourdon tube 20. As described elsewhere in detail, the invention is placed within the housing 12 and responds to movements of the Bourdon tube 20 to indicate the measured variable with respect to the scale 16.

Figure 2:
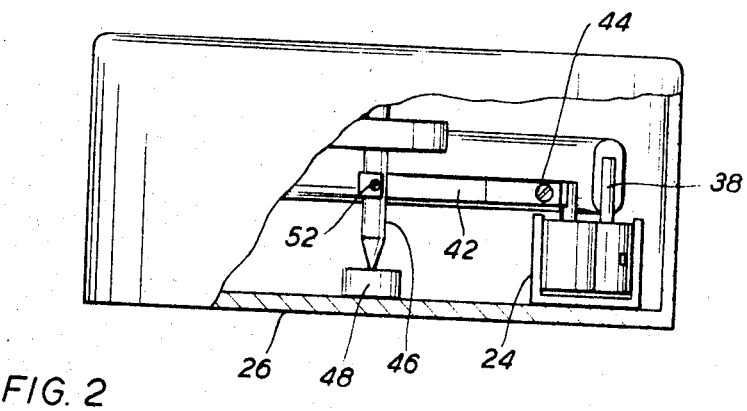
FIG. 2 is a side view of the structure shown in FIG. 1 with a portion thereof broken away to show connection of the transducer to the needle indicator.

The structure shown and claimed in the parent case is sufficiently described thereat. Hence the detailed description of FIGS. 1 and 2 will be omitted from the present disclosure.

Briefly, the present invention utilizes what is termed a "rollamite," which is described in literature of the Sandia Corp. of New Mexico. It is referred to herein as friction-free means, and more specifically, as means for converting the small transverse movements of the transducer into rotative movements without slippage or friction.

For an understanding of FIG. 3, reference is directed to strip chart recorder devices which have heretofore utilized a transducer which converts some variable such as pressure or flow into a small deflection of a transducer. They often utilize a gear train linkage or the like to move the ink pen. Typically, a chart is moved across the instrument by means of a clock drive mechanism moving the chart at a calibrated rate. A marker is mounted for perpendicular movement such as might incorporate pulleys on the opposite sides of a strip chart and a cable drive on which the ink pen is mounted. One of the pulleys is driven by the transducer through the gear train after conversion of the small deflection into movement having a suitable ratio for using the desired width of the chart.

Similar apparatus has been provided heretofore in the form of disc chart recorders. Typically, such charts are calibrated in time increments for recordation of one week's data. In such equipment, a timed motor rotates the disc chart for marking by an ink pen carried on a lever arm rotating about a fulcrum which is likewise responsive to the small movements of the transducer through an appropriate gear train. This apparatus is noted as being representative of the prior art and a structure over which the present invention distinguishes.

Attention is therefore directed to FIG. 3 which will be described in detail before discussion of the embodiment of FIGS. 6 and 7. FIG. 3 shows a strip chart recorder of conventional construction. The strip chart recorder is indicated by the numeral 110 and incorporates a suitable case or housing 112 which has a glass front 114 through which is viewed a strip chart 116. The strip chart 116 is usually a lengthy roll of chart paper which travels from an upper roller 118 to a lower roller 120. Depending on the construction, a supply of rolled or Z-folded paper is placed within the housing 112 and is first fed over the roller 118 and across the front of the instrument, typically passing over a platen and then to the roller 120. Thereafter, the paper is returned to a takeup roll or is stacked as a Z-fold accumulation of recorded chart. The chart's rollers 118 and 120 are driven in synchronism to tension the paper as it moves over the platen. The paper feed and takeup mechanism is believed well known and further description is omitted for sake of clarity.

Typically, a drive mechanism incorporating a synchronous or clock motor and appropriate gear train moves the strip chart paper 116 from the roller 118 toward the roller 120, or downwardly across the face of the chart recorder 110. The movement has a calculated rate whereby a particular time interval is measured on the strip chart for later analysis of data. The apparatus for controlling the speed of the motor for the chart drive is again believed well known and has been omitted for sake of clarity, but is described herein as part of the supporting structure for the present invention. Of significance to the present invention is the fact that the strip chart 116 moves at a calculated rate with respect to a writing instrument as will be discussed in detail.

Attention is directed to the ink pen 122 which is carried across the face of the strip chart paper 116. The ink pen 122 incorporates a conventional ink supply to make a trace on the paper as the paper moves from top to bottom of the apparatus and as the ink pen is deflected to the right or left in the below described manner.

The ink pen 122 is mounted on a transversely moving flexible member 124. The member 124 travels a complete circuit while moving parallel to and spaced from the strip chart paper 116 between the rollers 126 and 128. The rollers 126 and 128 are mounted at the left-hand and right-hand edges of the chart paper 116 to position the ink pen 122 for movement from one edge of the paper to the other. The ink pen 122, in the absence of movement of the paper 116, forms a horizontal line extending from one edge of the paper to the other on movement of the flexible member 124. The guide rollers 126 and 128 are preferably secured by appropriate mounting brackets with respect to the paper chart drive mechanism. The rollers 126 and 128 preferably engage the flexible member 124 and direct it across the face as shown in FIG. 3. It will be understood that the ink pen 122 is fixedly attached to the flexible member at a selected point to zero the instrument as will be described in detail hereinafter.

The precise nature of the flexible member 124 is subject to variation. For instance, the flexible member 124 may be a stainless steel strip of suitable flexibility. In this event, the rollers 126 and 128 are preferably solid rollers with a relatively thin coating of resilient material on the surface for some friction. While chain and gear drives may also be used, the force transmitted by the present apparatus is not so great as to require such a positive drive system, and to this extent, freewheeling rollers 126 and 128 are suitable. If desired, other forms of the flexible member may be adapted, including suitable drive belts and the like. For repeatability and accuracy in operation, the belt 124 is preferably constructed of a material which does not stretch or sag over long periods of usage so as to maintain accuracy of the strip chart recorder 110.

The flexible member 124 extends toward the rear of the case 112 in cooperation with a means to convert pressure fluctuations acting on a transducer to linear translation of the member 124. More particularly, the flexible member 124 extends about the periphery of a drive wheel 130. The drive wheel 130 is shown in greater detail in FIGS. 4 and 5 as will be described.

The apparatus in FIGS. 4 and 5 is shown absent a suitable mounting bracket which positions the means in the housing 112. Such apparatus is omitted for sake of clarity of the drawings. Of particular interest to the drawings is a U-shaped channel 132 positioned in near proximity to a transducer 134. The transducer 134 is supplied by a feed line 136 communicating fluid pressure or the like to the apparatus. While a number of transducers are well known, including diaphragms and Bourdon tubes, the present disclosure illustrates a bellows 134 by way of example. The fluid pressure variations are communicated through the conduit 136 into the bellows 134. As the bellows expand and contract in response to pressure changes, a control rod 138 connected to the bellows 134 and moved therewith deflects with respect to the U-shaped channel 132. Thus, the bellows are constructed and arranged to deflect a desired measure in response to preselected fluctuations. By way of example and not limitation, the apparatus has a zero or reference position at a predetermined pressure from which a deflection of perhaps one-quarter inch represents the maximum excursion from the reference pressure. While the details of calibration are noted herein, the apparatus is adapted for operation over a wide range of pressures and fluctuations.

The bellows 134 at the closed end is connected to the connecting rod 138. The rod 138 is L-shaped and extends through a slot 140 in the U-shaped channel 132 for connection with a roller 142. The roller is positioned within the U-shaped channel by a flexible member 144. The member 144 incorporates an S-shaped curve and has a locking relationship with an additional roller 146. The flexible member 144 keeps the rollers 142 and 146 in the same position relative to one another. On rotation of one of the rollers, the two rollers translate left or right as viewed in FIG. 4. The roller 142 is larger than the roller 146 to incorporate a multiplication factor which is the inverse of the ratio of the diameter of the rollers. Of course, the rollers may be equal in size or may attain any other relationship desired. Of interest to the present invention is the fact that the roller 142 is larger than the roller 146 to impart perhaps two turns for every one revolution of the roller 142. The rollers move in unison to the left or right as noted.

Movement of the roller 142 is in response to the deflection of the bellows 134 coupled by the connecting rod 138. The rod 138 moves in the slot 140 to avoid interference with the U-shaped channel 132. The flexible member 144 is attached at opposite facing walls of the channel 132 by suitable connective brads, fasteners, or the like. The member 144 is preferably a bendable member which does not elongate or fatigue. The member 144 is, by way of example and not limitation, a relatively thin and flat member formed of stainless steel. The member 144 contacts the outer periphery of the two rollers in a rolling contact as opposed to the slip-and-grab contact typically found in other bearing assemblies. The device is very nearly a frictionless device for the reason that there is no slippage between any of the members noted.

In FIG. 5, a shaft 148 joined to the roller 146 extends through the center of the drive wheel 130. The rotation of the wheel 130 is common with that of the roller 146. Should the roller 146 rotate twice for every one revolution of the roller 142, the same ratio is imparted to the drive wheel 130. More significantly, the wheel 130 engages at its outer periphery the flexible member 124 on which the ink pen 122 is mounted (see FIG. 3). Tracing through the apparatus as a whole, it will be appreciated and understood how perhaps a one-quarter inch deflection of the bellows 134 is converted into perhaps one-half revolution of the drive wheel 130, a movement sufficient to traverse the ink pen 122 across the strip chart paper 116. It should be noted that the ink pen movement is essentially without friction. The rollers 142 and 146 have only rolling contact against the flexible member 144. The drive wheel 130 likewise has only rolling contact against the flexible member 124. The two, in cooperation, provide a suitable multiplication factor or constant of proportionality in the structure without frictional loss. Preferably, a suitable bearing assembly or the like is included centrally of the rollers 142 as it rotates with respect to the bellows 144.

The apparatus described hereinabove is essentially without friction or slippage in operation. Of greater significance to the present invention is the fact that chatter and vibration has no effect or wear on the apparatus. Chatter imparted to the rollers 142 and 146 may cause extreme oscillatory vibrations in the equipment; however, wear is minimum because of the rolling contact of the various rollers against the flexible bands. More specifically, the apparatus has very little or no wear in the moving parts even over a long interval of time. Consequently, the equipment is adapted to function in a reliable manner in difficult environmental circumstances indefinitely without wear or fatigue. As a consequence, the apparatus is described herein as a frictionless means for converting the small differential movements of the transducer 134 to suitable linear movement of the indicator provided.

Figure 6:
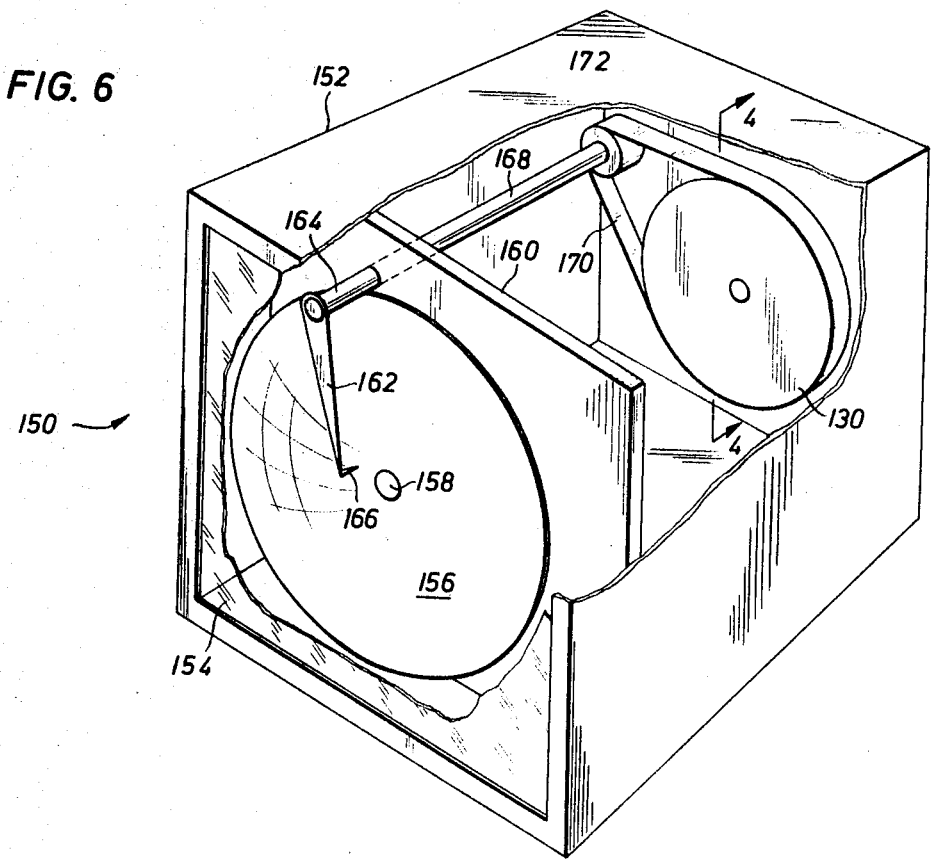
FIG. 6 is an alternative embodiment of a strip chart recorder in accord with the present invention; and, FIG. 7 is a linear scale indicator constituting a further alternative embodiment cooperative with the present invention.

While the foregoing is directed to the strip chart recorder 110 shown in FIG. 3, and describes the workings thereof, attention is next directed to FIG. 6 which shows a disc recorder 150. The disc recorder 150 incorporates a suitable case or cabinet 152 having a front sight glass 154 behind which a disc recording chart 156 is located. The chart 156 is typically a paper disc which is glued, clamped or otherwise attached to a flat circular plate. The plate is mounted on a shaft 158 which is journaled through a suitable backup plate 160 on which is mounted a drive motor (not shown) and suitable gear box. The disc chart 156 is rotated at a regulated speed. Should it be desired to record one week's data, the chart is rotated in a known manner so that the trace recorded on the chart makes approximately one revolution in the desired time interval. Since this is well known in the art and is found in disc recorders presently available, these functions are noted in passing as comprising portions of the present apparatus.

The length of the cabinet 152 has been exaggerated to show the mounting of the present invention in cooperation with the disc recorder apparatus. More particularly, a lever 162 connected to a fulcrum 164 moves an ink pen 166 across the face of the disc 156. The ink pen operates in a known manner to mark on the chart 156 which is removed when the apparatus is serviced. The chart is formed in response to movement of the ink pen 166 in an arcuate line about the fulcrum 164. In the embodiment shown, and taking in view the exaggerated length of the cabinet, the fulcrum 164 is coincident with a mounting shaft 168 which extends rearwardly of the apparatus. The shaft 168 is rotated in response to a flexible member 170 which passes about the periphery of a suitable drive wheel 130. The flexible drive belt 170 engages the edge of a small drive pulley 172 on the shaft 168. The ratio of the diameter of the pulley 172 and the drive wheel 130 is subject to variation and is selected depending on the swing needed for the pen 66 over the disc chart 156. The apparatus incorporating the drive wheel 130 is similar to that shown in FIGS. 4 and 5. That is to say, the disc recorder 150 incorporates the structure shown in FIGS. 4 and 5 which functions in the same manner to convert pressure fluctuations into movements of a transducer and thereafter into rotation of the drive wheel 130. Compared with FIG. 3, it will be noted that the drive wheel is mounted by suitable brackets in a vertical plane as opposed to the horizontal plane of FIG. 3. No significance is attached to the difference and the apparatus functions without regard to its orientation and space. The U-shaped channel is preferably mounted on a suitable bracket on the backwall of the strip chart recorder 150. Since the function of the motion converting means is similar to that noted hereinbefore, details of operation are omitted for the sake of brevity.

Figure 7:
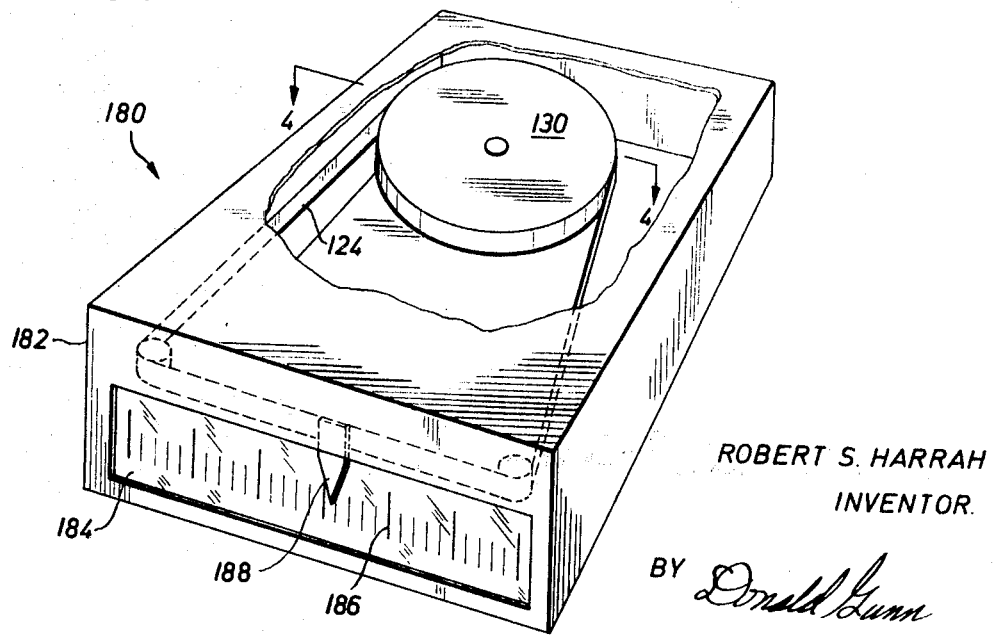

Attention is next directed to FIG. 7 of the drawings which shows a further embodiment utilizing the present invention. In FIG. 7, the numeral 180 identifies a linear scale indicator. The device incorporates a suitable cabinet 182 which is relatively thin. The cabinet 182 includes a sight glass 184, behind which a scale 186 is marked. Forwardly of the scale 186 is a pointer 188 which is quite similar to the ink pen 122 shown in FIG. 3 with the exception that the ink implement itself is omitted. The pointer 188 is transported by a flexible member 124, similar in operation and function to that shown in FIG. 3. Again, the member 124 is driven in response to rotation of a drive wheel 130 which is shown and described in greater detail in FIGS. 4 and 5. Again, the structure illustrated in FIGS. 4 and 5 is placed within the cabinet 182 for rotation of the drive wheel 130 in the manner described herein. The apparatus moves the pointer 188 with respect to the linear scale 186 to provide the suitable indications of the variable for which the apparatus indicates.

Several things should be noted with regard to the present apparatus. In many devices, it is sometimes necessary to provide a zero adjustment. This is accommodated in many ways. For instance, the strip chart recorder 110 shown in FIG. 3 preferably incorporates a set screw or clamp fitted to the ink pen 122 which enables the pen to be moved to a zero position with respect to the flexible member 124. Once a zero position is attained, no further adjustment problems are anticipated. The same form of adjustment is used for the linear indicator 180 which is shown in FIG. 7. A different form of zero adjustment is preferably utilized for the disc recorder 150 shown in FIG. 6. For instance, the lever arm 162 is preferably fastened to the shaft 168 by means of a screw threaded in the forward end of the shaft at 164. The screw is loosened and the tip of the pointer moved to the desired position to provide the needed zero adjustment. In all cases, an alternative zero adjustment may be attained by the use of a setscrew to fasten the drive wheel 130 to the shaft 148 on which it is mounted as shown in FIG. 5.

The various embodiments herein have omitted details of supporting structure for sake of clarity. For instance, the various drive motors, timing mechanisms and the like have been omitted. Since these may be varied widely, the indicator movements shown herein in FIGS. 3, 6 and 7 are adapted for use with a great variety of indicating equipment. Moreover, the apparatus is subject to modification and a variety of adaptations, the extent of which is believed obvious to one skilled in the art.

While the foregoing describes several preferred embodiments of the present invention, the scope hereof is determined by the claims appended hereto.

What I claim is:

1. Measuring apparatus comprising:
   a. transducer means adapted to move in response to a condition to be measured;
   b. circular chart means adapted for relative movement between spaced positions representative of a change of condition measured by said transducer means;
   c. means operatively arranged between said transducer means and said chart means for moving said chart means in response to movements of said transducer means and including a rollamite device having first and second rolling members movably confined thereon between opposed parallel guides and on opposite sides in the bights of an elongated reversely looped flexible band having its ends respectively secured in relation to said guides at spaced locations so that rolling movement of said first rolling member toward either of said spaced locations produces a corresponding rolling movement of said second rolling member toward the same spaced location;
   d. first means operatively linking said transducer means to said first rolling member; and
   e. second means operatively linking said second rolling member to said circular chart means.

2. The invention of claim 1 including means for rotating said chart means at a selected speed.

3. The invention of claim 1 including an elongated flexible band for communicating movement from said second means to said chart means.

4. The invention of claim 1 wherein said first and second members are cylindrical and one of said rolling members has a diameter greater than the other of said rolling members and greater than the difference between the spacing between said parallel guides and the diameter of said other rolling member.

5. The invention of claim 1 wherein said first and second rolling members are cylindrical and at least one of said rolling members has a diameter greater than the difference between the spacing between said parallel guides and the diameter of the other of said rollers.

6. The invention of claim 1 wherein said first linking means include a pivotal connection between said first rolling member and said transducer means whereby movement of said transducer means produces a corresponding rolling movement of said first rolling member; and said second linking means include an axial shaft secured to said second rolling member, a rigid member coupled to said axial shaft and adapted for rotation upon rolling movement of said second rolling member, and means interconnecting said rotatable member and said chart means for positioning said chart means in accordance with the angular position of said rigid member.

7. Measuring apparatus comprising:
   a. transducer means adapted to move in response to a condition to be measured;
   b. linear indicator means adapted for relative movement between spaced positions representative of a change of condition measured by said transducer means;
   c. means operatively arranged between said transducer means and said indicator means for moving said indicator means in response to movements of said transducer means and including a rollamite device having first and second rolling members movably confined thereon between opposed parallel guides and on opposite sides in the bights of an elongated reversely looped flexible band having its ends respectively secured in relation to said guides at spaced locations so that rolling movement of said first rolling member toward either of said spaced locations produces a corresponding rolling movement of said second rolling member toward the same spaced location;

d. first means operatively linking said transducer means to said first rolling member; and e. second means operatively linking said second rolling member to said linear indicator means.

8. The invention of claim 7 including means for rotating said indicator means at a selected speed.

9. The invention of claim 7 including an elongated flexible band for communicating movement from said second means to said indicator means.

10. The invention of claim 7 wherein said first and second members are cylindrical and one of said rolling members has a diameter greater than the other of said rolling members and greater than the difference between the spacing between said parallel guides and the diameter of said other rolling member.

11. The invention of claim 7 wherein said first and second rolling members are cylindrical and at least one of said rolling members has a diameter greater than the difference between the spacing between said parallel guides and the diameter of the other of said rollers.

12. The invention of claim 7 wherein said first linking means include a pivotal connection between said first rolling member and said transducer means whereby movement of said transducer means produces a corresponding rolling movement of said first rolling member; and said second linking means include an axial shaft secured to said second rolling member, a rigid member coupled to said axial shaft and adapted for rotation upon rolling movement of said second rolling member, and means interconnecting said rotatable member and said indicator means for positioning said indicator means in accordance with the angular position of said rigid member.

13. The invention of claim 7 wherein said linear indicator means includes a sight glass means, a visible indicator therebehind having suitable units marked therein, and a pointer means visible through said sight glass means for indicating a measure with respect to the units on said visible indicator.

14. The invention of claim 7 including
a. an elongate chart material;
b. a marker means for marking on said material;
c. roller means for guiding said material relative to said marker means;
d. motive means for moving said material past said marker means at a selected speed; and
e. means connected to said marker means and comprising at least a portion of said second means.